(12) United States Patent
Cygan, Jr. et al.

(10) Patent No.: US 10,094,300 B2
(45) Date of Patent: Oct. 9, 2018

(54) SYSTEM AND METHOD FOR CONTROLLING AN ENGINE USING MODEL PREDICTIVE CONTROL TO MINIMIZE THE EFFECT OF CHANGES IN VALVE LIFT STATE ON ENGINE OPERATION

(71) Applicant: GM Global Technology Operations LLC, Detroit, MI (US)

(72) Inventors: Gary Robert Cygan, Jr., West Bloomfield, MI (US); Julian R. Verdejo, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 308 days.

(21) Appl. No.: 14/798,876

(22) Filed: Jul. 14, 2015

(65) Prior Publication Data

US 2016/0363057 A1    Dec. 15, 2016

Related U.S. Application Data

(60) Provisional application No. 62/172,973, filed on Jun. 9, 2015.

(51) Int. Cl.
*F02D 13/02* (2006.01)
*F02D 13/06* (2006.01)
(Continued)

(52) U.S. Cl.
CPC ........ *F02D 13/0207* (2013.01); *F02D 11/105* (2013.01); *F02D 13/06* (2013.01);
(Continued)

(58) Field of Classification Search
CPC .... F02D 13/0207; F02D 11/105; F02D 13/06; F02D 41/0087; F02D 41/1406;
(Continued)

(56) References Cited

U.S. PATENT DOCUMENTS 6,234,141 B1 * 5/2001 Kerns ................... F02D 35/023
                                                         123/179.16
9,528,453 B2    12/2016 Whitney et al.
(Continued)

OTHER PUBLICATIONS

U.S. Appl. No. 14/798,973, filed Jul. 14, 2015, Pochner et al.
U.S. Appl. No. 14/617,068, filed Feb. 9, 2015, Whitney et al.

*Primary Examiner* — Thomas Moulis
*Assistant Examiner* — John Bailey

(57) ABSTRACT

A system according to the principles of the present disclosure includes an engine actuator control module and at least one of a valve lift control module and a cylinder activation module. The valve lift control module adjusts a target lift state of a valve actuator of an engine to adjust an amount by which at least one of an intake valve of a cylinder of the engine and an exhaust valve of the cylinder is lifted from a valve seat. The cylinder activation module determines a target number of activated cylinders in the engine. The engine actuator control module that controls a first actuator of the engine at a present time based on at least one of the target lift state at a future time and the target number of activated cylinders at the future time. The first actuator is different than the valve actuator.

20 Claims, 5 Drawing Sheets

(51) Int. Cl.
*F02D 41/00* (2006.01)
*F02D 41/14* (2006.01)
*F02D 11/10* (2006.01)

(52) U.S. Cl.
CPC ..... *F02D 41/0087* (2013.01); *F02D 41/1406* (2013.01); *F02D 2041/001* (2013.01); *F02D 2041/1412* (2013.01); *F02D 2041/1433* (2013.01); *F02D 2250/18* (2013.01); *Y02T 10/18* (2013.01)

(58) Field of Classification Search
CPC ....... F02D 2041/001; F02D 2041/1412; F02D 2041/1433; F02D 2250/18; F02D 13/0226; F02D 13/023; F02D 13/02; F01L 13/0015; F01L 2013/118
USPC ....... 123/321, 322, 404, 636, 349, 361, 396, 123/324, 481, 325, 332, 692, 344, 345, 123/347, 348, 402, 405, 500, 90.11, 123/339.2, 346, 480, 403, 399, 319; 60/601; 73/114.15; 290/17; 701/101, 701/102, 103, 108
See application file for complete search history.

(56) References Cited

U.S. PATENT DOCUMENTS

| | | | |
|---|---|---|---|
| 2004/0112331 A1* | 6/2004 | Miura | F01L 1/022 123/346 |
| 2006/0037578 A1* | 2/2006 | Nakamura | F01L 1/185 123/198 F |
| 2006/0276952 A1 | 12/2006 | Niessen et al. | |
| 2007/0006831 A1* | 1/2007 | Leone | F01L 13/0005 123/90.15 |
| 2008/0120009 A1 | 5/2008 | Livshiz et al. | |
| 2009/0013945 A1 | 1/2009 | Buckland et al. | |
| 2009/0030588 A1 | 1/2009 | Yamashita | |
| 2010/0154741 A1 | 6/2010 | Arnett et al. | |
| 2010/0154757 A1 | 6/2010 | Miyamoto et al. | |
| 2011/0239987 A1* | 10/2011 | Maehara | F01L 1/181 123/406.46 |
| 2014/0360179 A1* | 12/2014 | Doering | F02B 37/183 60/602 |
| 2015/0267573 A1* | 9/2015 | van den Heuvel | F01L 9/025 123/90.16 |
| 2015/0322869 A1* | 11/2015 | Shost | F02D 41/0002 123/481 |
| 2015/0345371 A1* | 12/2015 | Russ | F02B 37/04 123/542 |
| 2016/0003169 A1* | 1/2016 | Leone | F02D 41/0087 123/481 |
| 2016/0040607 A1* | 2/2016 | Ku | F02D 41/0065 123/568.17 |
| 2016/0047341 A1* | 2/2016 | Styles | F02D 41/0065 123/568.18 |
| 2016/0053697 A1* | 2/2016 | Pirjaberi | F02D 17/02 123/406.45 |
| 2016/0061069 A1* | 3/2016 | Grosch | F01L 13/0047 123/90.15 |
| 2016/0061118 A1* | 3/2016 | Hioka | F02D 41/0087 123/346 |
| 2016/0108798 A1* | 4/2016 | VanDerWege | F02D 41/0087 60/602 |
| 2016/0146120 A1* | 5/2016 | Kawaguchi | F02D 41/008 123/559.2 |
| 2016/0215705 A1* | 7/2016 | Haizaki | F02D 13/0215 |
| 2016/0237920 A1* | 8/2016 | Higashio | F02P 5/045 |
| 2016/0363057 A1 | 12/2016 | Cygan, Jr. et al. | |

* cited by examiner

SYSTEM AND METHOD FOR CONTROLLING AN ENGINE USING MODEL PREDICTIVE CONTROL TO MINIMIZE THE EFFECT OF CHANGES IN VALVE LIFT STATE ON ENGINE OPERATION

CROSS-REFERENCE TO RELATED APPLICATIONS

This application claims the benefit of U.S. Provisional Application No. 62/172,973, filed on Jun. 9, 2015. The disclosure of the above application is incorporated herein by reference in its entirety.

CROSS-REFERENCE TO RELATED APPLICATIONS

This application is related to U.S. patent application Ser. No. 14/798,973 filed on Jul. 14, 2015. The entire disclosure of the above application is incorporated herein by reference.

FIELD

The present disclosure relates to internal combustion engines, and more particularly, to systems and methods for controlling an engine using model predictive control to minimize the effect of changes in valve lift state on engine operation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system according to the principles of the present disclosure includes an engine actuator control module and at least one of a valve lift control module and a cylinder activation module. The valve lift control module adjusts a target lift state of a valve actuator of an engine to adjust an amount by which at least one of an intake valve of a cylinder of the engine and an exhaust valve of the cylinder is lifted from a valve seat. The cylinder activation module determines a target number of activated cylinders in the engine. The engine actuator control module that controls a first actuator of the engine at a present time based on at least one of the target lift state at a future time and the target number of activated cylinders at the future time. The first actuator is different than the valve actuator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
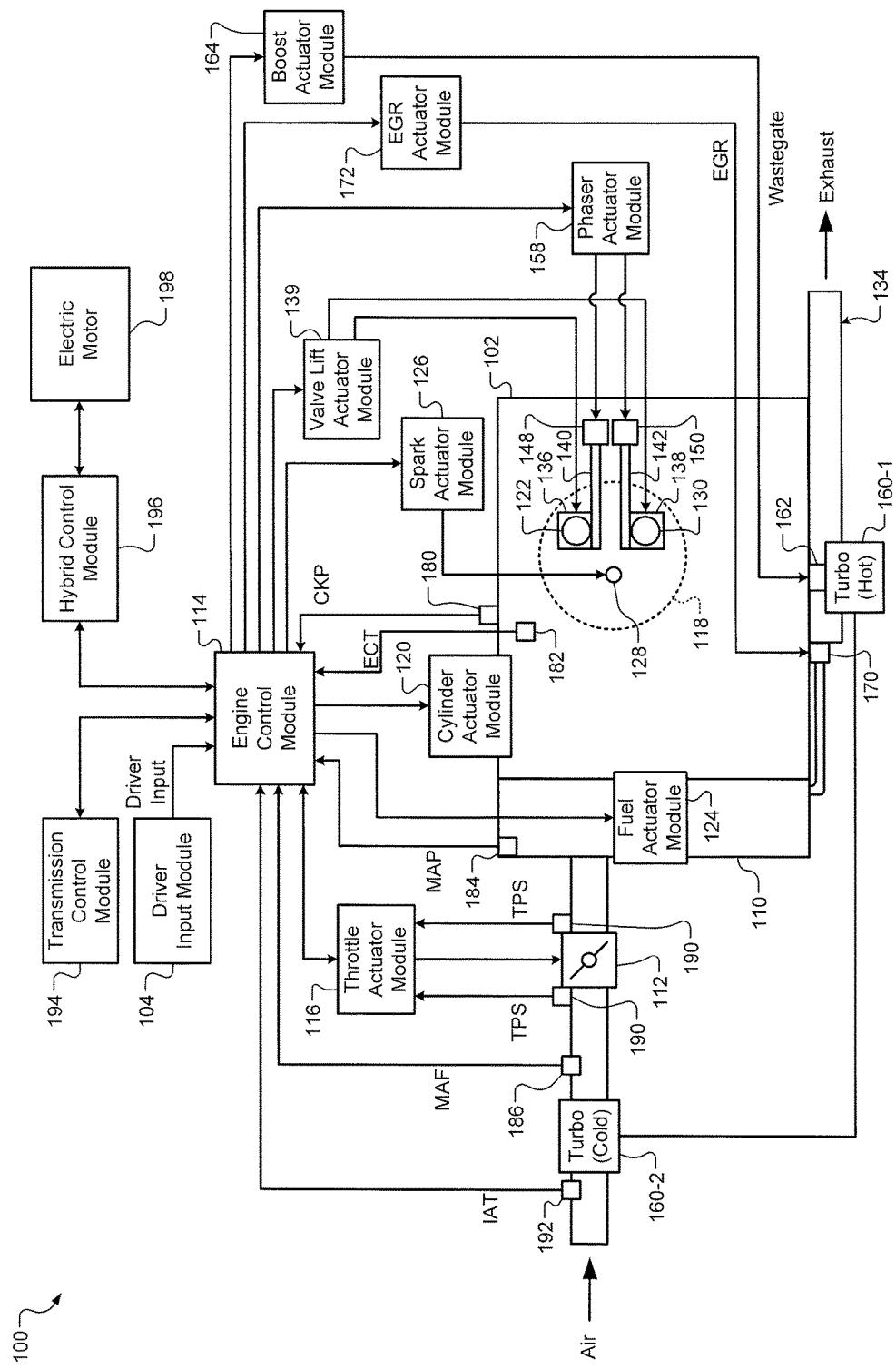
FIG. 1 is a functional block diagram of an example engine system according to the present disclosure.

An engine control module (ECM) controls torque output of an engine. More specifically, the ECM determines target values for actuators of the engine based on a requested amount of torque and controls the actuators based on the target values. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure generates the target values using model predictive control (MPC). More specifically, the ECM identifies possible sets of target values based on an engine torque request. The ECM determines predicted parameters for each of the possible sets based on the possible sets' target values and a mathematical model of the engine. For example, the ECM determines a predicted engine output torque and a predicted air per cylinder (APC) for each of the possible sets of target values. The ECM may also determine one or more other predicted parameters for each possible set of target values.

The ECM may determine a cost associated with use of each of the possible sets. The ECM determines the cost based on a first difference between the predicted engine output torque determined for that possible set and the engine torque request. The cost determined for a possible set increases as a magnitude of the first difference increases and vice versa.

The ECM may select the one of the possible sets having the lowest cost. In this manner, the ECM may select the one of the possible sets that is predicted to most closely track the engine torque request. The ECM sets the target values for controlling the engine actuators using the target values of the selected possible set. In various implementations, instead of or in addition to identifying possible sets of target values and determining the cost of each of the sets, the ECM may generate a surface representing the cost of possible sets of target values. The ECM may then identify the possible set that has the lowest cost based on the slope of the cost surface.

The ECM generates a target lift state to adjust an amount by which intake and exhaust valves of a cylinder are lifted from their respective valve seats. For example, the ECM may switch the target lift state between a low lift state and a high lift state. In the low lift state, the intake and exhaust valves are lifted from their respective valve seats by a first amount. In the high lift state, the intake and exhaust valves are lifted from their respective valve seats by a second amount that is greater than the first amount. The ECM may also generate a target number of activated cylinders to adjust a number of activated cylinders in the engine.

As noted above, the target values generated by the ECM using MPC may include target air actuator values such as target intake and exhaust phaser angles, a target throttle opening, a target EGR opening, and a target wastegate duty cycle. However, some ECMs may not use MPC to generate a target lift state or a target number of activated cylinders. Thus, target values determined using MPC may not control the amount of airflow through the engine as accurately as desired when the lift state changes and/or when cylinders are deactivated or activated. In turn, the ECMs may not control the torque output of the engine as accurately as desired. In addition, the ECMs may not achieve optimal fuel economy.

An ECM according to the present disclosure determines future values of the target lift state and/or the target number of activated cylinders and accounts for these future values when generating the other target values using MPC. In one example, the ECM determines predicted parameters for possible sets of the other target values, the future values of the target lift state, and a mathematical model of the engine. In another example, the ECM determines predicted parameters for possible sets of the other target values, the future values of the target number of activated cylinders, and the mathematical model of the engine. In either example, the ECM determines a cost associated with each of the possible sets of the other target values based on the predicted parameters and selects the one of the possible sets having the lowest cost.

The ECM may generate the other target values for a current control loop using MPC in the manner described above based on the target values of the lift state and/or the number of activated cylinders for several (e.g., 10) control loops in the future. This allows the ECM to react to changes in the lift state and/or the number of activated cylinders before the changes occur. For example, the ECM may increase a target throttle opening at a present time to compensate for an anticipated decrease in the amount of airflow through the engine due to a change in the target lift state from a high lift state to a low lift state at a future time. Since the ECM is able to react to changes in the lift state and/or the number of activated cylinders before the changes occur, the ECM may control the amount of airflow through the engine during these transitions more accurately than other ECMs. As a result, the ECM may control the torque output of the engine more accurately than other ECMs. In addition, the ECM may achieve better fuel economy than other ECMs.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle.

Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve lift actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as camless valve actuators.

The intake and exhaust valve actuators 136 and 138 may vary the amount by which the intake and exhaust valves 122 and 130 are lifted from their respective valve seats. For example, the intake and exhaust valve actuators 136 and 138 may switch between a first lift state and a second lift state. The intake and exhaust valve actuators 136 and 138 may cause the intake and exhaust valves 122 and 130 to lift from their respective valve seats by a first amount when operating in the first lift state. The intake and exhaust valve actuators 136 and 138 may cause the intake and exhaust valves 122 and 130 to lift from their respective valve seats by a second amount when operating in the second lift state. The first and second amounts may be predetermined, nonzero values. In addition, and the second amount may be greater than the first amount. In this regard, the first lift state may be referred to as a low lift state, and the second lift state may be referred to as a high lift state.

When the intake and exhaust valve actuators 136 and 138 are cam driven, each of the intake and exhaust valve actuators 136 and 138 may include a cam follower having a height that is adjustable to vary the lift of the intake and exhaust valves 122 and 130. Alternatively, each of the intake and exhaust valve actuators 136 and 138 may include a solenoid that translates a camshaft segment along the length of one of the camshafts 140 and 142 to cause a cam follower to engage different lobes on the camshaft segment. The lobes may have different heights so that switching which one of the lobes the cam follower engages varies the lift of the intake and exhaust valves 122 and 130. Valve actuators such as these may be referred to as sliding cam actuators.

When the intake and exhaust valve actuators 136 and 138 are camless valve actuators, the valve actuators 136 and 138 may also adjust the timing of the intake and exhaust valves 122 and 130, respectively. When the intake and exhaust valve actuators 136 and 138 are cam driven, the timing of the intake and exhaust valves 122 and 130 may be adjusted by intake and exhaust cam phasers 148, 150, respectively. A phaser actuator module 158 may adjust the position of the intake and exhaust cam phasers 148, 150 based on signals received from the ECM 114.

The cylinder actuator module 120 may deactivate the cylinder 118 by instructing the valve lift actuator module 139 to disable opening of the intake valve 122 and/or the exhaust valve 130. When the intake valve actuator 136 is cam driven, the intake valve actuator 136 may disable opening of the intake valve 122 by decoupling the intake valve 122 from the intake camshaft 140. Similarly, when the exhaust valve actuator 138 is cam driven, the exhaust valve actuator 138 may disable opening of the exhaust valve 130 by decoupling the exhaust valve 130 from the exhaust camshaft 142.

In various implementations, the valve lift actuator module 139 may disable opening of the intake and exhaust valves 122 and 130 by switching the intake and exhaust valve actuators 136 and 138 to a third lift state. The intake and exhaust valve actuators 136 and 138 may lift the intake and exhaust valves 122 and 130 from their respective valve seats by a third amount when operating in the third lift state. The third amount may be zero. Thus, the third lift state may be referred to as a zero lift state.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172 based on signals from the ECM 114.

A position of the crankshaft may be measured using a crankshaft position (CKP) sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The valve lift actuator module 139 controls the intake and exhaust valve actuators 136 and 138 to achieve a target lift state. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The capacity actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
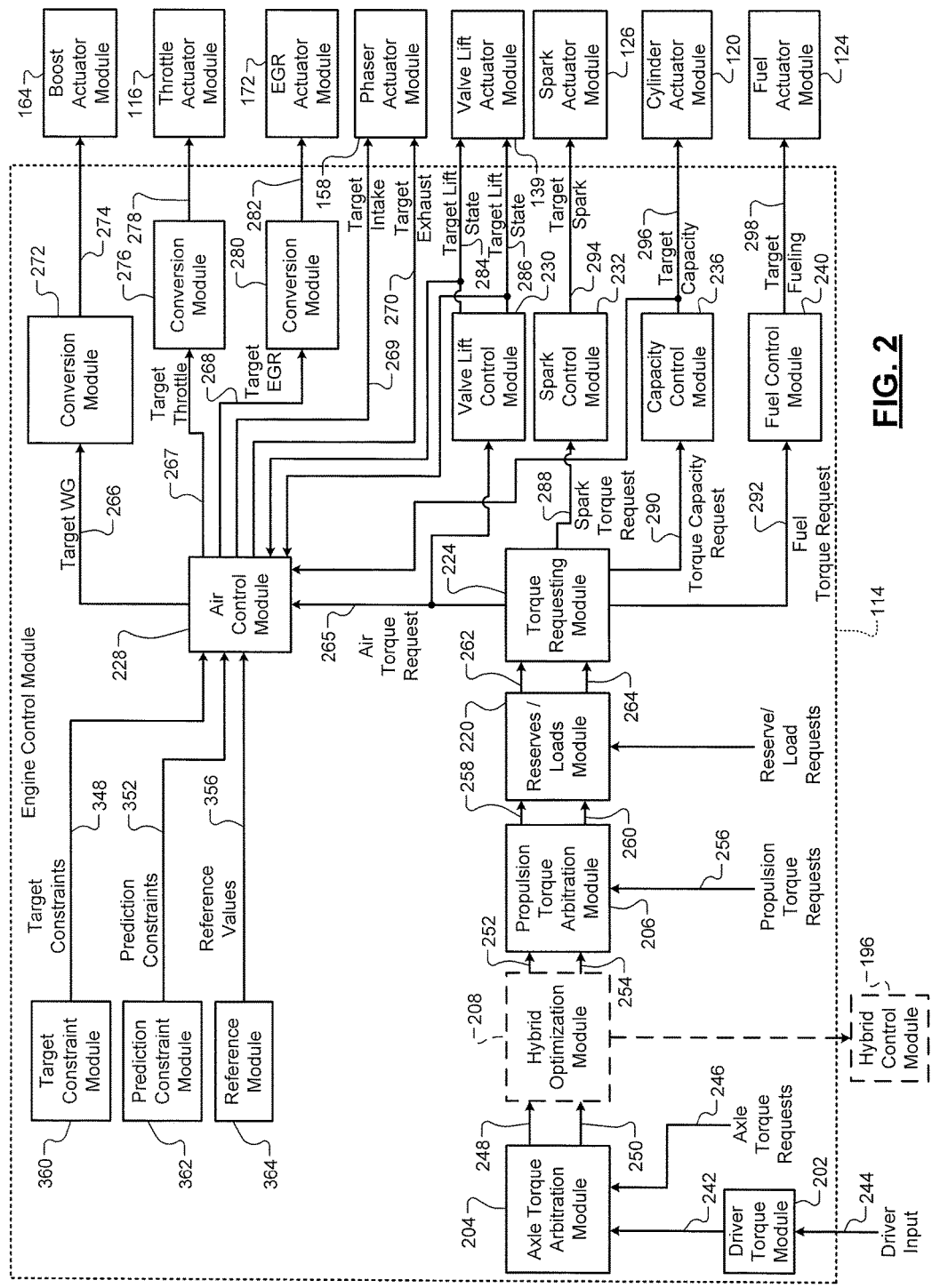
FIG. 2 is a functional block diagram of an example control system according to the present disclosure.

Referring now to FIG. 2, an example implementation of the ECM 114 includes a driver torque module 202, an axle torque arbitration module 204, and a propulsion torque arbitration module 206. The ECM 114 may include a hybrid optimization module 208. The ECM 114 may also include a reserves/loads module 220, a torque requesting module 224, an air control module 228, a valve lift control module 230, a spark control module 232, a capacity control module 236, and/or a fuel control module 240.

The driver torque module 202 may determine a driver torque request 242 based on a driver input 244 from the driver input module 104. The driver input 244 may be based on, for example, a position of an accelerator pedal and/or a position of a brake pedal. The driver input 244 may also be based on a cruise control system, which may be an adaptive cruise control system that varies vehicle speed to maintain a predetermined following distance. The driver torque module 202 may store one or more mappings of accelerator pedal position to target torque and may determine the driver torque request 242 based on a selected one of the mappings.

The axle torque arbitration module 204 arbitrates between the driver torque request 242 and other axle torque requests 246. Axle torque (torque at the wheels) may be produced by various sources including an engine and/or an electric motor. For example, the axle torque requests 246 may include a torque reduction requested by a traction control system when positive wheel slip is detected. Positive wheel slip occurs when axle torque overcomes friction between the wheels and the road surface, and the wheels begin to slip against the road surface. The axle torque requests 246 may also include a torque increase request to counteract negative wheel slip, where a tire of the vehicle slips in the other direction with respect to the road surface because the axle torque is negative.

The axle torque requests 246 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 246 may also be generated by vehicle stability control systems.

The axle torque arbitration module 204 outputs a predicted torque request 248 and an immediate torque request 250 based on the results of arbitrating between the received torque requests 242 and 246. As described below, the predicted and immediate torque requests 248 and 250 from the axle torque arbitration module 204 may selectively be adjusted by other modules of the ECM 114 before being used to control the engine actuators.

In general terms, the immediate torque request 250 may be an amount of currently desired axle torque, while the predicted torque request 248 may be an amount of axle torque that may be needed on short notice. The ECM 114 controls the engine system 100 to produce an axle torque equal to the immediate torque request 250. However, different combinations of target values may result in the same axle torque. The ECM 114 may therefore adjust the target values to enable a faster transition to the predicted torque request 248, while still maintaining the axle torque at the immediate torque request 250.

In various implementations, the predicted torque request 248 may be set based on the driver torque request 242. The immediate torque request 250 may be set to less than the predicted torque request 248 under some circumstances, such as when the driver torque request 242 is causing wheel slip on an icy surface. In such a case, a traction control system (not shown) may request a reduction via the immediate torque request 250, and the ECM 114 reduces the engine torque output to the immediate torque request 250. However, the ECM 114 performs the reduction so the engine system 100 can quickly resume producing the predicted torque request 248 once the wheel slip stops.

In general terms, the difference between the immediate torque request 250 and the (generally higher) predicted torque request 248 can be referred to as a torque reserve. The torque reserve may represent the amount of additional torque (above the immediate torque request 250) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 248. Meanwhile, the spark timing can be set based on the immediate torque request 250, which is less than the predicted torque request 248. Although the throttle opening generates enough air flow for the engine 102 to produce the predicted torque request 248, the spark timing is retarded (which reduces torque) based on the immediate torque request 250. The engine output torque will therefore be equal to the immediate torque request 250.

When additional torque is needed, the spark timing can be set based on the predicted torque request 248 or a torque between the predicted and immediate torque requests 248 and 250. By the following firing event, the spark actuator module 126 may return the spark timing to an optimum value, which allows the engine 102 to produce full engine output torque achievable with the air flow already present. The engine output torque may therefore be quickly increased to the predicted torque request 248 without experiencing delays from changing the throttle opening.

The axle torque arbitration module 204 may output the predicted torque request 248 and the immediate torque request 250 to the propulsion torque arbitration module 206. In various implementations, the axle torque arbitration module 204 may output the predicted and immediate torque requests 248 and 250 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 252 and 254, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 256, including the converted predicted and immediate torque requests. The propulsion torque arbitration module 206 generates an arbitrated predicted torque request 258 and an arbitrated immediate torque request 260. The arbitrated torque requests 258 and 260 may be generated by selecting a winning request from among received torque requests. Alternatively or additionally, the arbitrated torque requests may be generated by modifying one of the received requests based on another one or more of the received torque requests.

For example, the propulsion torque requests 256 may include torque reductions for engine over-speed protection, torque increases for stall prevention, and torque reductions requested by the transmission control module 194 to accommodate gear shifts. The propulsion torque requests 256 may also result from clutch fuel cutoff, which reduces the engine output torque when the driver depresses the clutch pedal in a manual transmission vehicle to prevent a flare in engine speed.

The propulsion torque requests 256 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 258 and 260.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 258 and 260. The reserves/loads module 220 may adjust the arbitrated predicted and immediate torque requests 258 and 260 to create a torque reserve and/or to compensate for one or more loads. The reserves/loads module 220 then outputs adjusted predicted and immediate torque requests 262 and 264 to the torque requesting module 224.

For example only, a catalyst light-off process or a cold start emissions reduction process may require retarded spark timing. The reserves/loads module 220 may therefore increase the adjusted predicted torque request 262 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 262 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 262 and 264. The torque requesting module 224 determines how the adjusted predicted and immediate torque requests 262 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 262 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below. The air control module 228 may be referred to as an engine actuator control module.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 may determine a target overlap factor and a target effective displacement, and the phaser actuator module 158 may control the intake and exhaust cam phasers 148 and 150 to achieve the target overlap factor and the target effective displacement.

The valve lift control module 230 determines a target lift state 284 for the intake valve actuator 36 and a target lift state 286 for the exhaust valve actuator 38. The valve lift control module 230 may determine the target lift states 284, 286 based on the air torque request 265, a target number of activated cylinders in the engine 102, and an amount of load on the engine 102. The valve lift control module 230 may determine the target lift states 284, 286 based on these parameters using a predetermined relationship, which may be embodied in a lookup table and/or an equation. The valve lift control module 230 may use the mass flow rate of intake air from the MAF sensor 186 as an approximation of the engine load. The valve lift actuator module 139 controls the intake and exhaust valve actuators 136 and 138 to achieve the target lift states 284 and 286, respectively.

The valve lift control module 230 may switch the target lift states 284, 286 between the first (low) lift state and the second (high) lift state. The valve lift control module 230 may normally adjust the target lift states 284, 286 to the first lift state to improve fuel economy, as decreasing the amount of airflow through the cylinders decreases the amount of fuel required to achieve a target air/fuel ratio. However, as the air torque request 265 increases, the valve lift control module 230 may switch the target lift states 284, 286 from the first lift state to the second lift state to increase the torque capacity of the engine 102 in order to satisfy the air torque request 265. For example, the valve lift control module 230 may switch the target lift states 284, 286 from the first lift state to the second lift state when the air torque request 265 is greater than a threshold, which may be a function of the target number of activated cylinders. In addition, even when this condition is not satisfied, it may be more fuel efficient to adjust the target lift states 284, 286 to the second lift state when a high amount of boost is needed to fill the cylinders with air in the first lift state due to a high engine load. Thus, as noted above, the valve lift control module 230 may consider the engine load in addition to the air torque request 265 and the number of activated cylinders when adjusting the target lift states 284, 286.

The valve lift control module 230 may determine future values of the target lift states 284, 286 based on the air torque request 265, the target number of activated cylinders in the engine 102, and the amount of load on the engine 102. The valve lift control module 230 may determine the future values of the target lift states 284, 286 based on future values of the air torque request 265, the target number of activated cylinders in the engine 102, and the amount of load on the engine 102. The valve lift control module 230 may determine the future values of these parameters based on whether these parameters are increasing or decreasing and, if so, a rate at which the parameters are increasing or decreasing.

The torque requesting module 224 may also generate a spark torque request 288, a torque capacity request 290, and a fuel torque request 292 based on the predicted and immediate torque requests 262 and 264. The spark control module 232 may determine how much to retard the spark timing (which reduces engine output torque) from an optimum spark timing based on the spark torque request 288. For example only, a torque relationship may be inverted to solve for a target spark timing 294. For a given torque request ($T_{Req}$), the target spark timing ($S_T$) 294 may be determined based on:

$$S_T = f^{-1}(T_{Req}, APC, I, E, AF, OT, \#), \quad (1)$$

where APC is air per cylinder, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The capacity control module 236 may determine a target torque capacity 296 based on the torque capacity request 290. In one example, the target torque capacity 296 may indicate the target number of activated cylinders. In another example, a target number of deactivated cylinders may be used. In either case, the capacity control module 236 may be referred to as a cylinder activation module. The capacity actuator module 120 may deactivate one or more cylinders of the engine 102 based on the target number of activated cylinders. The capacity actuator module 120 may instruct the valve lift actuator module 139 to disable opening of the intake valve 122 and/or the exhaust valve 130 of deactivated cylinders. The capacity actuator module 120 may instruct the fuel actuator module 124 to stop providing fuel for deactivated cylinders and may instruct the spark actuator module 126 to stop providing spark for deactivated cylinders. The spark actuator module 126 may stop providing spark to a cylinder once an air/fuel mixture that is already present in the cylinder has been combusted.

The capacity control module 236 may determine future values of the target number of activated cylinders based on the torque capacity request 290. The capacity control module 236 may determine the future values of the target number of activated cylinders based on future values of the torque capacity request 290. The valve lift control module 230 may determine the future values of the torque capacity request 290 based on whether the torque capacity request 290 is increasing or decreasing and, if so, a rate at which the torque capacity request 290 is increasing or decreasing.

The fuel control module 240 may vary the amount of fuel provided to each cylinder based on the fuel torque request 292. More specifically, the fuel control module 240 may generate target fueling parameters 298 based on the fuel torque request 292. The target fueling parameters 298 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
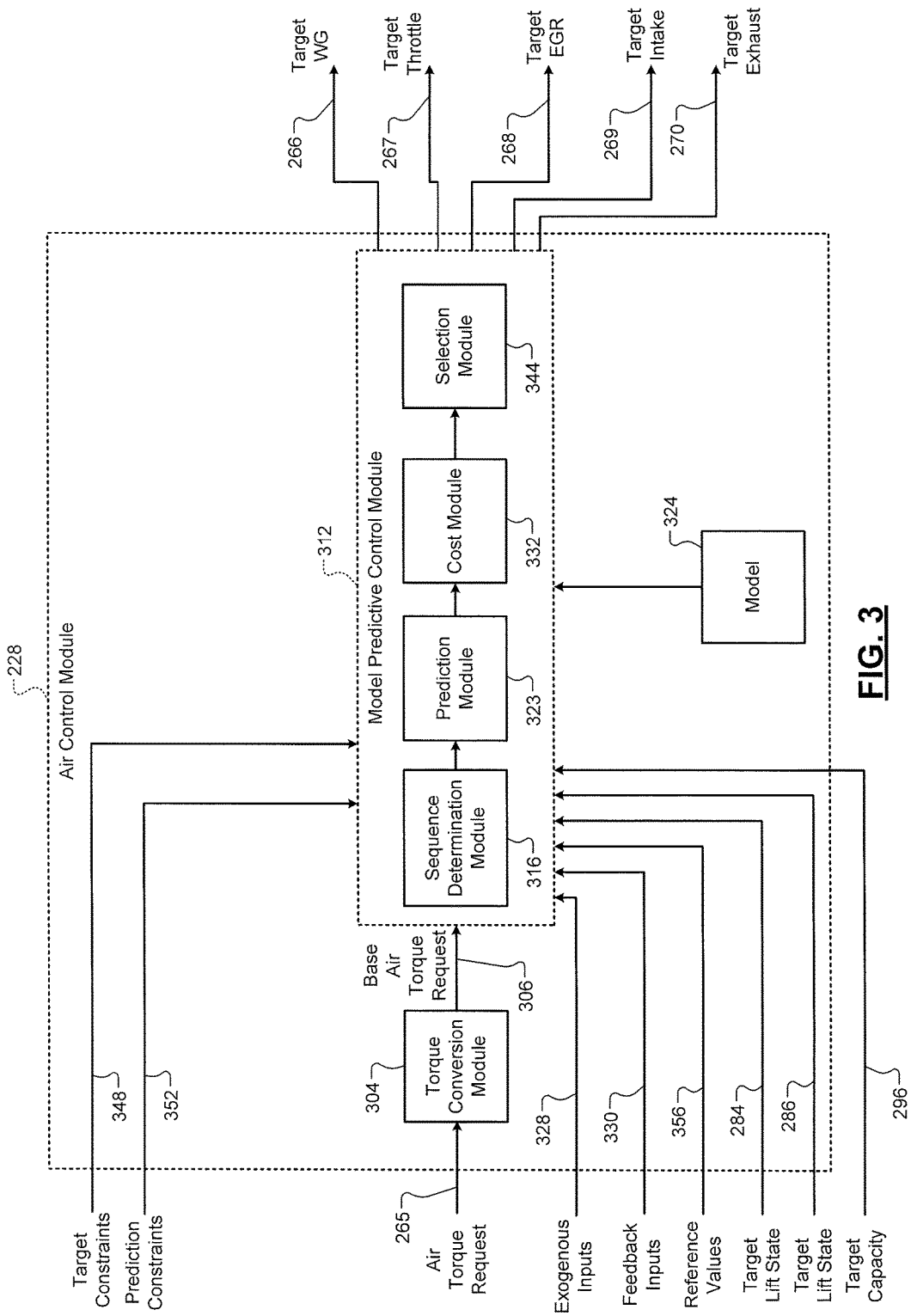
FIG. 3 is a functional block diagram of an example air control module according to the present disclosure.

FIG. 3 is a functional block diagram of an example implementation of the air control module 228. Referring now to FIGS. 2 and 3, as discussed above, the air torque request 265 may be a brake torque. A torque conversion module 304 converts the air torque request 265 from brake torque into base torque. The torque request resulting from conversion into base torque is referred to herein as a base air torque request 306.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 306, for example, using a mapping or a function that relates brake torques to base torques. In various implementations, the torque conversion module 304 may convert the air torque request 265 into another suitable type of torque, such as an indicated torque. An indicated torque may refer to a torque at the crankshaft attributable to work produced via combustion within the cylinders.

An anticipated torque request module 308 generates anticipated torque requests for N (e.g., 10) control loops in the future. The anticipated torque requests may be referred to collectively as an anticipated torque trajectory. The anticipated torque request module 308 outputs base air torque requests 310, which include the base air torque request 306 for the current control loop and the anticipated torque requests for the N control loops.

An MPC module 312 generates the target values 266-270 using a MPC (Model Predictive Control) scheme. The MPC module 312 may be a single module or may comprise multiple modules. For example, the MPC module 312 may include a sequence determination module 316. The sequence determination module 316 determines possible sequences of the target values 266-270 that could be used together during the N control loops.

Each of the possible sequences identified by the sequence determination module 316 includes one sequence of N values for each of the target values 266-270. In other words, each possible sequence includes a sequence of N values for the target wastegate opening area 266, a sequence of N values for the target throttle opening area 267, a sequence of N values for the target EGR opening area 268, a sequence of N values for the target intake cam phaser angle 269, and a sequence of N values for the target exhaust cam phaser angle 270. Each of the N values are for a corresponding one of the N future control loops. N is an integer greater than or equal to one.

A prediction module 323 predicts responses of the engine 102 to the possible sequences of the target values 266-270 and the future values of the target lift states 284, 286 based on a (mathematical) model 324 of the engine 102, exogenous inputs 328, and feedback inputs 330. More specifically, based on a possible sequence of the target values 266-270, the future values of the target lift states 284, 286, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops. The future values of the target lift sates 284, 286 may include a target lift state for each of the N control loops.

The model 324 may be, for example, a function or a mapping calibrated based on characteristics of the engine 102 including characteristics of the intake and exhaust valve actuators 136 and 138. Thus, the model 324 may define a relationship between the responses of the engine 102, the target values 266-270, the future values of the target lift states 284, 286, the exogenous inputs 328, and the feedback inputs 330. The prediction module 323 may use this relationship defined by the model 324 to predict the responses of the engine 102 to the possible sequences of the target values 266-270 and the future values of the target lift states 284, 286 based on the exogenous inputs 328 and the feedback inputs 330.

The relationship between the responses of the engine 102, the target values 266-270, the future values of the target lift states 284, 286, the exogenous inputs 328, and the feedback inputs 330 may be nonlinear over the entire range of possible engine speeds and engine loads. However, the model 324 may include a plurality of linear models that each correspond to an engine speed and load range. The prediction module 323 may select one of the models based on the current engine speed and load, and use the selected model to predict the responses of the engine 102. For example, a first model may be used in an engine speed range from 1000 revolutions per minute (RPM) to 2000 RPM and an engine load range from 100 Newton-meters (Nm) to 150 Nm. A second model may be used in an engine speed range from 1000 RPM to 2000 RPM and an engine load range from 150 Nm to 200 Nm. A third model may be used in an engine speed range from 2000 RPM to 3000 RPM and an engine load range from 100 Nm to 150 Nm.

In various implementations, the prediction module 323 may use the model 324 to predict the responses of the engine 102 to the future values of the target number of activated cylinders in addition to or instead of predicting the responses of the engine 102 to the future values of the target lift sates 284, 286. As noted above, the target capacity 296 may indicate the target number of activated cylinders. The future values of the target number of activated cylinders may include a target number of activated cylinders for each of the N control loops Dilution may refer to an amount of exhaust from a prior combustion event trapped within a cylinder for a combustion event. External dilution may refer to exhaust provided for a combustion event via the EGR valve 170. Residual dilution (also referred to as internal dilution) may refer to exhaust that remains in a cylinder and/or exhaust that is pushed back into the cylinder following the exhaust stroke of a combustion cycle.

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5—approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The exogenous inputs 328 may include parameters that are not directly affected by the throttle valve 112, the EGR valve 170, the turbocharger, the intake cam phaser 148, and the exhaust cam phaser 150. For example, the exogenous inputs 328 may include engine speed, turbocharger inlet air pressure, IAT, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated residual dilution, an estimated external dilution, and/or one or more other suitable parameters. The feedback inputs 330 may be measured using sensors (e.g., the IAT) and/or estimated based on one or more other parameters.

A cost module 332 determines a cost value for each of the possible sequences of the target values 266-270 based on the predicted parameters determined for a possible sequence. An example cost determination is discussed further below. A selection module 344 selects one of the possible sequences of the target values 266-270 based on the costs of the possible sequences, respectively. For example, the selection module 344 may select the one of the possible sequences having the lowest cost while satisfying target constraints 348 and prediction constraints 352.

In various implementations, satisfaction of the target constraints 348 and the prediction constraints 352 may be considered in the cost determination. In other words, the cost module 332 may determine the cost values further based on the target constraints 348 and the prediction constraints 352. In various implementations, the cost module 332 may determine the cost values based on reference values 356 for each of the target values 266-270. As discussed further below, based on how the cost values are determined, the selection module 344 will select the one of the possible sequences that best achieves the base air torque request 306 while minimizing the APC, subject to the target constraints 348 and the prediction constraints 352.

The selection module 344 may set the target values 266-270 to the respective first ones of the N values of the selected sequence. In other words, the selection module 344 may set the target wastegate opening area 266 to the first one of the N values in the sequence of N values for the target wastegate opening area 266, set the target throttle opening area 267 to the first one of the N values in the sequence of N values for the target throttle opening area 267, set the target EGR opening area 268 to the first one of the N values in the sequence of N values for the target EGR opening area 268, set the target intake cam phaser angle 269 to the first one of the N values in the sequence of N values for the target intake cam phaser angle 269, and set the target exhaust cam phaser angle 270 to the first one of the N values in the sequence of N values for the target exhaust cam phaser angle 270.

During a next control loop, the MPC module 312 identifies possible sequences, generates the predicted parameters for the possible sequences, determines the cost of each of the possible sequences, selects of one of the possible sequences based on the cost, and sets of the target values 266-270 to the first set of the target values 266-270 in the selected sequence. This process continues for each control loop. By predicting parameters for the possible sequences based on future values of the target lift sates 284, 286 or the target number of activated cylinders, determining the cost of each of the possible sequences, and selecting one of the possible sequences based on the cost, the MPC module 312 may optimize the target values 266-270 for transitions in valve lift states or the number of activated cylinders. In turn, the ECM 114 may control airflow through the engine 102 more accurately than other engine control modules, which may improve engine torque control and improve fuel economy.

A target constraint module 360 (see FIG. 2) sets one of the target constraints 348 for each of the target values 266-270. In other words, the target constraint module 360 sets an target constraint for the throttle valve 112, an target constraint for the EGR valve 170, an target constraint for the wastegate 162, an target constraint for the intake cam phaser 148, and an target constraint for the exhaust cam phaser 150.

The target constraints 348 for each one of the target values 266-270 may include a maximum value for an associated target value and a minimum value for that target value. The target constraint module 360 may generally set the target constraints 348 to predetermined operational ranges for the associated actuators. More specifically, the target constraint module 360 may generally set the target constraints 348 to predetermined operational ranges for the throttle valve 112, the EGR valve 170, the wastegate 162, the intake cam phaser 148, and the exhaust cam phaser 150, respectively.

However, the target constraint module 360 may selectively adjust one or more of the target constraints 348 under some circumstances. For example, the target constraint module 360 may adjust the target constraints for a given actuator to narrow the operational range for that engine actuator when a fault is diagnosed in that engine actuator. For another example only, the target constraint module 360 may adjust the target constraints such that the target value for a given actuator follows a predetermined schedule over time or changes by a predetermined amount, for example, for a fault diagnostic, such as a cam phaser fault diagnostic, a throttle diagnostic, an EGR diagnostic, etc. For a target value to follow a predetermined schedule over time or to change by a predetermined amount, the target constraint module 360 may set the minimum and maximum values to the same value. The minimum and maximum values being set to the same value may force the corresponding target value to be set to the same value as the minimum and maximum values. The target constraint module 360 may vary the same value to which the minimum and maximum values are set over time to cause the target value to follow a predetermined schedule.

A prediction constraint module 362 (see FIG. 2) sets the prediction constraints 352 for the predicted torque output of the engine 102, the predicted CA50, the predicted COV of IMEP, the predicted residual dilution, and the predicted external dilution. The prediction constraints 352 for each one of the predicted values may include a maximum value for an associated predicted parameter and a minimum value for that predicted parameter. For example, the prediction constraints 352 may include a minimum torque, a maximum torque, a minimum CA50 and a maximum CA50, a minimum COV of IMEP and a maximum COV of IMEP, a minimum residual dilution and a maximum residual dilution, and a minimum external dilution and a maximum external dilution.

The prediction constraint module 362 may generally set the prediction constraints 352 to predetermined ranges for the associated predicted parameters, respectively. However, the prediction constraint module 362 may vary one or more of the prediction constraints 352 under some circumstances. For example, the prediction constraint module 362 may retard the maximum CA50, such as when knock occurs within the engine 102. For another example, the prediction constraint module 362 may increase the maximum COV of IMEP under low load conditions, such as during engine idling where a higher COV of IMEP may be needed to achieve a given torque request.

A reference module 364 (see FIG. 2) generates the reference values 356 for the target values 266-270. The reference values 356 include a reference for each of the target values 266-270. In other words, the reference values 356 include a reference wastegate opening area, a reference throttle opening area, a reference EGR opening area, a reference intake cam phaser angle, and a reference exhaust cam phaser angle.

The reference module 364 may determine the reference values 356, for example, based on the air torque request 265, the base air torque request 306, and/or one or more other suitable parameters. The reference values 356 provide references for setting the target values 266-270, respectively. The reference values 356 may be used to determine the cost values for possible sequences. The reference values 356 may also be used for one or more other reasons, such as by the sequence determination module 316 to determine possible sequences.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 266-270 using a quadratic programming (QP) solver, such as a Dantzig QP solver. In another example, the MPC module 312 may generate a surface of cost values for the possible sequences of the target values 266-270 and, based on the slope of the cost surface, identify a set of possible target values having the lowest cost. The MPC module 312 may then test that set of possible target values to determine whether that set of possible target values will satisfy the target constraints 348 and the prediction constraints 352. If so, the MPC module 312 may set the target values 266-270 to the first ones of the N values of that selected possible sequence, respectively, as discussed above.

If the target constraints 348 and/or the prediction constraints 352 are not satisfied, the MPC module 312 selects another sequence of possible target values with a next lowest cost and tests that sequence of possible target values for satisfaction of the target constraints 348 and the prediction constraints 352. The process of selecting a sequence and testing the sequence for satisfaction of the target constraints 348 and the prediction constraints 352 may be referred to as an iteration. Multiple iterations may be performed during each control loop.

The MPC module 312 performs iterations until a sequence with the lowest cost that satisfies the target constraints 348 and the prediction constraints 352 is identified. In this manner, the MPC module 312 selects the sequence of possible target values having the lowest cost while satisfying the target constraints 348 and the prediction constraints 352.

The cost module 332 may determine the cost for the possible sequences of the target values 266-270 based on relationships between: the predicted torque and base air torque requests; the possible target values and the respective target constraints 348; the predicted parameters and the respective prediction constraints 352; and the possible target values and the respective reference values 356. The relationships may be weighted, for example, to control the effect that each of the relationships has on the cost.

For example only, the cost module 332 may determine the cost for a possible sequence of the target values 266, 268-270, and 320 based on or using the following equation:

$$\text{Cost} = \Sigma_{i=1}^{N} \rho \epsilon^2 + \|wT^*(TP_i - BATR_i)\|^2,$$

subject to the target constraints 348 and the prediction constraints 352. Cost is the cost for the possible sequence of the target values 266, 268-270, and 320, TPi is the predicted torque of the engine 102 for an i-th one of the N control loops, BATRi is the base air torque request for the i-th one of the N control loops, and wT is a weighting value associated with the relationship between the predicted torque and the torque requests. $BATR_1$ is the base air torque request 306. In various implementations, $BATR_2$-$BATR_N$ may also be set to the base air torque request 306, or $BATR_2$-$BATR_N$ may be set based on future engine torque requests for the future ones of the N control loops.

ρ is a weighting value associated with satisfaction of the prediction constraints 352. ϵ is a variable that the cost module 332 may set based on whether the prediction constraints 352 will be satisfied. For example, the cost module 332 may increase ϵ when a predicted parameter is greater than or less than the corresponding minimum or maximum value (e.g., by at least a predetermined amount). The cost module 332 may set ϵ to zero when all of the prediction constraints 352 are satisfied. ρ may be greater than the weighting value wT and other weighting values discussed below (wPR, wWG, wEGR, wIP, wEP) such that the cost determined for a possible sequence will be large if one or more of the prediction constraints 352 are not satisfied. This may help prevent selection of a possible sequence where one or more of the prediction constraints 352 are not satisfied.

The above equation can be expanded, for example, to:

$$\text{Cost} = \Sigma_{i=1}^{N} \rho \epsilon^2 + \|wT^*(TP_i - BATR_i)\|^2 + \|wA^*(APCP_i - \text{MinAPC})\|^2 + \|wTV^*(PTTOi - TORef)\|^2 + \|wWG^* (PTWGOi - EGORef)\|^2 + \|wEGR^*(PTEGROi - EGRORef)\|^2 + \|wIP^*(PTICPi - ICPRef)\|^2 + \|wEP^* (PTECPi - ECPRef)\|^2,$$

subject to the target constraints 348 and the prediction constraints 352. Cost is the cost for the possible sequence of the target values 266-270, TPi is the predicted torque of the engine 102 for an i-th one of the N control loops, BATR is the base air torque request 306, and wT is a weighting value associated with the relationship between the predicted torque and the base air torque request 306. APCPi is a predicted APC for the i-th one of the N control loops, MinAPC is a predetermined minimum APC, and wA is a weighting value associated with the relationship between the predicted APC and the predetermined minimum APC.

PTTOi is a possible target throttle opening for the i-th one of the N control loops, TORef is the reference throttle opening, and wTV is a weighting value associated with the relationship between the possible target throttle openings and the reference throttle opening. PTWGOi is a possible target wastegate opening for the i-th one of the N control loops, WGORef is the reference wastegate opening, and wWG is a weighting value associated with the relationship between the possible target wastegate openings and the reference wastegate opening.

PTEGROi is a possible target EGR opening for the i-th one of the N control loops, EGRRef is the reference EGR opening, and wEGR is a weighting value associated with the relationship between the possible target EGR openings and the reference EGR opening. PTICi is a possible target intake cam phaser angle for the i-th one of the N control loops, ICPRef is the reference intake cam phaser angle, and wIP is a weighting value associated with the relationship between the possible target intake cam phaser angle and the reference intake cam phaser angle. PTECi is a possible target exhaust cam phaser angle for the i-th one of the N control loops, ECPRef is the reference exhaust cam phaser angle, and wEP is a weighting value associated with the relationship between the possible target exhaust cam phaser angle and the reference exhaust cam phaser angle.

The weighting value wT may be greater than the weighting value wA and the weighting values wTV, wWG, wEGR, wIP, and wEP. In this manner, the relationship between the relationship between the predicted engine torque and the base air torque request 306 have a larger effect on the cost and, therefore, the selection of one of the possible sequences as discussed further below. The cost increases as the difference between the predicted engine torque and the base air torque request 306 increases and vice versa.

The weighting value wA may be less than the weighting value wT and greater than the weighting values wTV, wWG, wEGR, wIP, and wEP. In this manner, the relationship between the predicted APC and zero has a large effect on the cost, but less than the relationship between the predicted engine torque and the base air torque request 306. The cost increases as the difference between the predicted APC and the predetermined minimum APC increases and vice versa. For example only, the predetermined minimum APC may be zero or another suitable value.

Determining the cost based on the difference between the predicted APC and the predetermined minimum APC helps ensure that the APC will be minimized. Decreasing APC decreases fuel consumption as fueling is controlled based on the actual APC to achieve a target air/fuel mixture. As the selection module 344 may select the one of the possible sequences having the lowest cost, the selection module 344 may select the one of the possible sequences that best achieves the base air torque request 306 while minimizing APC. While the example of minimizing APC is discussed, in various implementations, an efficiency parameter may be predicted and maximized. For example, the efficiency parameter may be predicted torque divided by predicted APC or a predicted fuel consumption.

The weighting values wTV, wWG, wEGR, wIP, and wEP may be less than all of the other weighting values. In this manner, during steady-state operation, the target values 266-270 may settle near or at the reference values 356, respectively. During transient operation, however, the MPC module 312 may adjust the target values 266-270 away from the reference values 356 in order to achieve the base air torque request 306, while minimizing the APC and satisfying the target constraints 348 and the prediction constraints 352.

Figure 4:
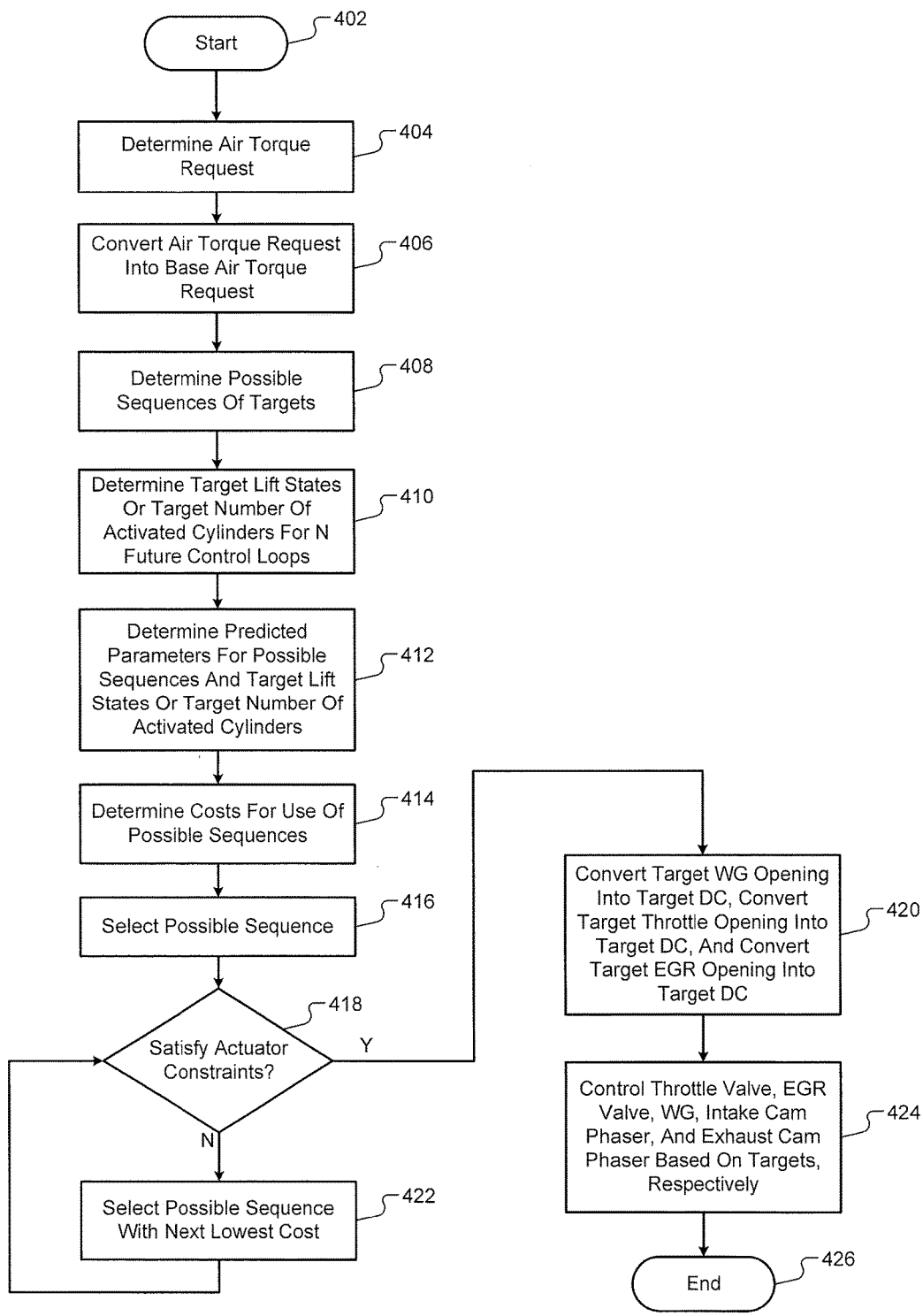
FIG. 4 is a flowchart illustrating an example method of controlling an engine using model predictive control according to the present disclosure.

Referring now to FIG. 4, an example method of controlling the throttle valve 112, the intake cam phaser 148, the exhaust cam phaser 150, the wastegate 162 (and therefore the turbocharger), and the EGR valve 170 using MPC (model predictive control) begins at 402. The method is described in the context of the modules of FIGS. 2 and 3. However, the particular modules that perform the steps of the method may be different than the modules mentioned below and/or the method may be implemented apart from the modules of FIGS. 2 and 3.

At 404, the torque requesting module 224 determines the air torque request 265 based on the adjusted predicted and immediate torque requests 262 and 264. At 406, the torque conversion module 304 converts the air torque request 265 into the base air torque request 306 or into another suitable type of torque for use by the MPC module 312. At 408, the sequence determination module 316 determines possible sequences of the target values 266-270 based on the base air torque request 306. At 410, the valve lift control module 230 determines the target lift states 284, 286 for the N control loops in the future. Additionally or alternatively, the capacity control module 236 may determine the target number of activated cylinders of the engine 102 for the N control loops.

At 412, the prediction module 323 predicts the responses of the engine 102 for the target lift states and each of the possible sequences of the other target values. The prediction module 323 determines the predicted parameters for the possible sequences based on the model 324 of the engine 102, the exogenous inputs 328, and the feedback inputs 330.

More specifically, based on the target lift states 284, 286, a possible sequence of the target values 266-270, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops. In various implementations, the prediction module 323 may predict the responses of the engine 102 to the target number of activated cylinders in addition to or instead of predicting the responses of the engine 102 to the target lift sates 284, 286.

At 414, the cost module 332 determines the costs for the possible sequences, respectively. For example only, the cost module 332 may determine the cost for a possible sequence of the target values 266-270 based on the equation $$Cost = \Sigma_{i=1}^{N} \rho e^2 + \|wT^*(TP_i - BATR)\|^2 + \|wA^*(APCP_i - 0)\|^2 + \|wTV^*(PTTOi - TORef)\|^2 + \|wWG^*(PTWGOi - EGORef)\|^2 + \|wEGR^*(PTEGROi - EGRORef)\|^2 + \|wIP^*(PTICPi - ICPRef)\|^2 + \|wEP^*(PTECPi - ECPRef)\|^2,$$

subject to the target constraints 348 and the prediction constraints 352, as discussed above.

At 416, the selection module 344 selects one of the possible sequences of the target values 266-270 based on the costs of the possible sequences. For example, the selection module 344 may select the one of the possible sequences having the lowest cost. The selection module 344 may therefore select the one of the possible sequences that best achieves the base air torque request 306 while minimizing the APC. Instead of or in addition to determining possible sequences of the target values 266-270 at 408 and determining the cost of each of the sequences at 414, the MPC module 312 may identify a sequence of possible target values having the lowest cost using convex optimization techniques as discussed above.

At 418, the MPC module 312 determines whether the selected one of the possible sequences satisfies the target constraints 348. If the selected one of the possible sequences satisfies the target constraints 348, the method continues at 420. Otherwise, the method continues at 422, where the MPC module 312 selects the one of the possible sequences with the next lowest cost. The method then returns to 418. In this manner, the sequence with the lowest cost that satisfies the target constraints 348 is used.

At 420, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. Also at 420, the third conversion module 280 converts the target EGR opening area 268 into the target duty cycle 282 to be applied to the EGR valve 170. Also at 420, the fourth conversion module converts the target intake and exhaust cam phaser angles 269 and 270 into the target intake and exhaust duty cycles to be applied to the intake and exhaust cam phasers 148 and 150, respectively.

At 424, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267.

Also at 424, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While the method is shown ending at 426, FIG. 4 may illustrate one control loop, and control loops may be executed at a predetermined rate (e.g., 25 milliseconds).

Figure 5:
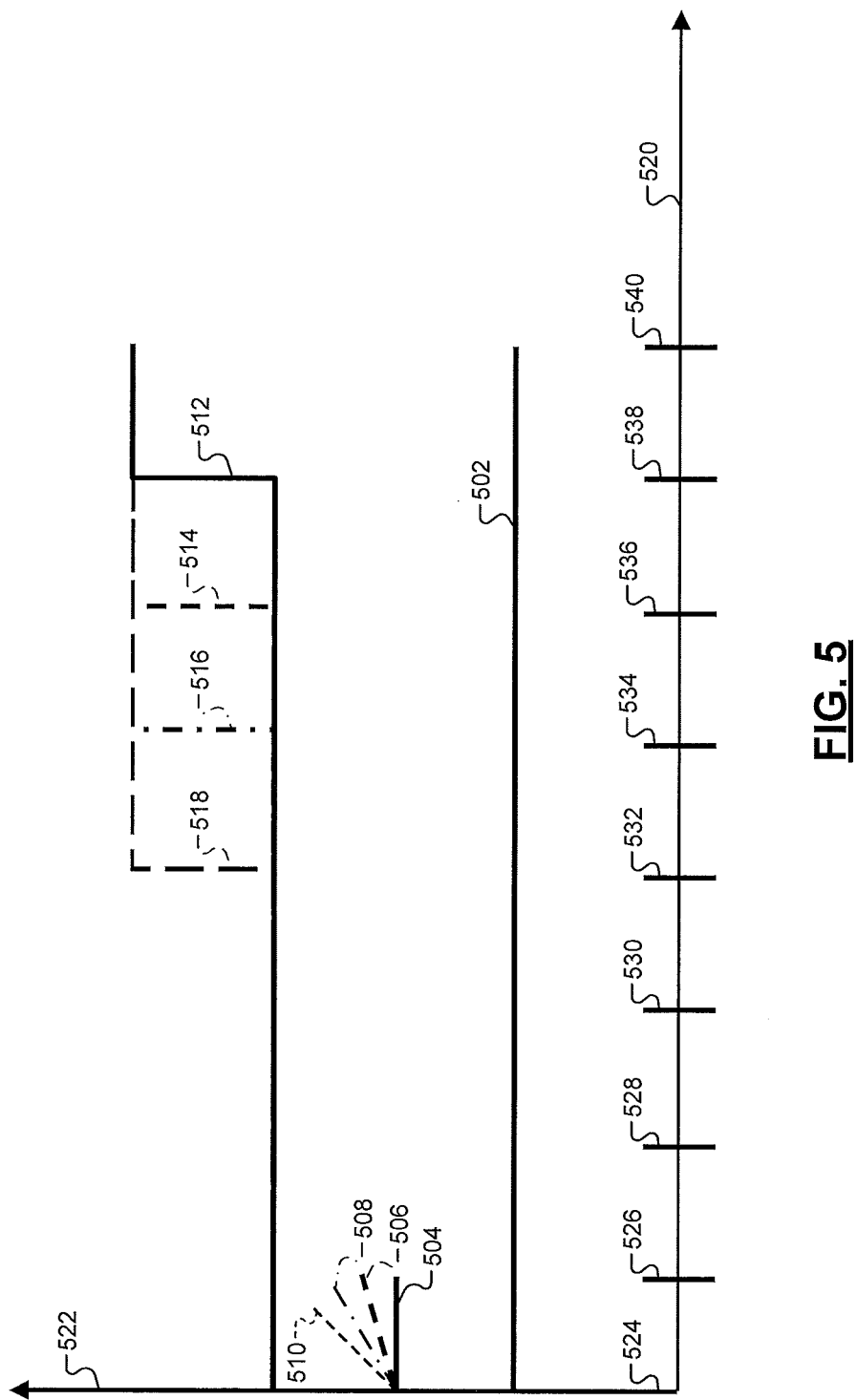
FIG. 5 is a graph illustrating example signals for controlling an engine using model predictive control according to the present disclosure.

Referring now to FIG. 5, a torque request signal 502, target throttle opening signals 504-510, and target lift state signals 512-518 are plotted with respect to an x-axis 520 and a y-axis 522. The x-axis 520 represents a prediction horizon in time steps or control loops. In one example, the loop rate of each control loop is 25 milliseconds. The y-axis 522 represents a magnitude of the torque request signal 502, the target throttle opening signals 504-510, and the target lift state signals 512-518.

The torque request signal 502 remains constant over the prediction horizon including control loops 524-540. The target throttle opening signals 504-510 indicate target throttle openings for control loops 524-530, respectively. For example, when the control loop 524 is the current control loop, the target throttle opening area for the current control loop is indicated by the target throttle opening signal 504.

The target lift state signal 512 indicates a target lift state over the prediction horizon when the control loop 524 is the current control loop and the control loops 526-540 are future control loops. The target lift state signal 514 indicates the target lift state over the prediction horizon when the control loop 526 is the current control loop and the control loops 528-540 are future control loops. The target lift state signal 514 indicates the target lift state over the prediction horizon when the control loop 528 is the current control loop and the control loops 530-540 are future control loops. The target lift state signal 514 indicates the target lift state over the prediction horizon when the control loop 530 is the current control loop and the control loops 532-540 are future control loops.

A system and method according to the present disclosure uses MPC (model predictive control) to adjust a target throttle opening for a current control loop based on a torque request and target lift states for future control loops. For example, when the control loop 524 is the current control loop, the target lift state signal 512 indicates that the target lift state is scheduled to switch from a high lift state to a low lift state in the control loop 538, which is 7 control loops in the future. Thus, the target throttle opening signal 504 may be relatively flat. However, when the control loop 526 is the current control loop, the target lift state signal 514 indicates that the target lift state is scheduled to switch from the high lift state to the low lift state in 6 control loops. Thus, the target throttle opening signal 506 may be greater than the target throttle opening signal 504.

Similarly, when the control loop 528 is the current control loop, the target lift state signal 516 indicates that the target lift state is scheduled to switch from the low lift state to the high lift state in 5 control loops. Thus, the target throttle opening signal 508 may be greater than the target throttle opening signal 506. Likewise, when the control loop 530 is the current control loop, the target lift state signal 518 indicates that the target lift state is scheduled to switch from the high lift state to the low lift state in 4 control loops. Thus, the target throttle opening signal 510 may be greater than the target throttle opening signal 508. In this manner, the system and method increases the target throttle area in response to a decrease in the number of control loops between the current control loop and the control loop in which the lift state switches. Notably, since the torque request signal 502 remains constant over the prediction horizon, the changes in the target throttle openings indicated by the target throttle opening signals 504-510 are solely due to the anticipated change in the target lift state.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   at least one of:
      a valve lift control module that adjusts a target lift state of a valve actuator of an engine to adjust an amount by which at least one of an intake valve of a cylinder of the engine and an exhaust valve of the cylinder is lifted from a valve seat; and
      a cylinder activation module that determines a target number of activated cylinders in the engine; and
   an engine actuator control module that controls a first actuator of the engine at a present time based on at least one of the target lift state at a future time and the target number of activated cylinders at the future time, wherein the first actuator is different than the valve actuator.

2. The system of claim 1 wherein the first actuator includes at least one of a wastegate, a throttle valve, an exhaust gas recirculation valve, and a camshaft phaser.

3. The system of claim 1 wherein the engine actuator control module controls the first actuator at the present time based on the target lift state at the future time.

4. The system of claim 1 wherein:
   the engine actuator control module controls the first actuator at the present time based on N target lift states at N future times; and
   N is an integer greater than one.

5. The system of claim 1 wherein the engine actuator control module controls the first actuator at the present time based on the target number of activated cylinders at the future time.

6. The system of claim 1 wherein:
   the engine actuator control module controls the first actuator at the present time based on N target number of activated cylinders at N future times; and
   N is an integer greater than one.

7. The system of claim 1 wherein the valve lift control module determines the target lift state based on a driver torque request, the target number of activated cylinders, and an amount of load on the engine.

8. The system of claim 1 further comprising a model predictive control (MPC) module that:
   predicts operating parameters of the engine for a set of possible target values for the first actuator and the at least one of the target lift state at the future time and the target number of activated cylinders at the future time;
   determines a cost for the set of possible target values based on the predicted operating parameters;
   selects the set of possible target values from multiple sets of possible target values based on the cost; and
   sets target values to the possible target values of the selected set, wherein the engine actuator control module controls the first actuator based on at least one of the target values.

9. The system of claim 8 wherein the MPC module determines the cost for each of the sets of possible target values based on differences between (i) a predicted torque output of the engine corresponding to each of the sets of possible target values and the at least one of the target lift state at the future time and the target number of activated cylinders at the future time and (ii) a torque request.

10. The system of claim 8 wherein the MPC module determines the cost for each of the sets of possible target values based on differences between the possible target values and reference values.

11. A method comprising:
at least one of:
adjusting a target lift state of a valve actuator of an engine to adjust an amount by which at least one of an intake valve of a cylinder of the engine and an exhaust valve of the cylinder is lifted from a valve seat; and
determining a target number of activated cylinders in the engine; and
controlling a first actuator of the engine at a present time based on at least one of the target lift state at a future time and the target number of activated cylinders at the future time, wherein the first actuator is different than the valve actuator.

12. The method of claim 11 wherein the first actuator includes at least one of a wastegate, a throttle valve, an exhaust gas recirculation valve, and a camshaft phaser.

13. The method of claim 11 further comprising controlling the first actuator at the present time based on the target lift state at the future time.

14. The method of claim 11 further comprising controlling the first actuator at the present time based on N target lift states at N future times, wherein N is an integer greater than one.

15. The method of claim 11 further comprising controlling the first actuator at the present time based on the target number of activated cylinders at the future time.

16. The method of claim 11 further comprising controlling the first actuator at the present time based on N target number of activated cylinders at N future times, wherein N is an integer greater than one.

17. The method of claim 11 further comprising determining the target lift state based on a driver torque request, the target number of activated cylinders, and an amount of load on the engine.

18. The method of claim 11 further comprising:
predicting operating parameters of the engine for a set of possible target values for the first actuator and the at least one of the target lift state at the future time and the target number of activated cylinders at the future time;
determining a cost for the set of possible target values based on the predicted operating parameters;
selecting the set of possible target values from multiple sets of possible target values based on the cost;
setting target values to the possible target values of the selected set; and
controlling the first actuator based on at least one of the target values.

19. The method of claim 18 further comprising determining the cost for each of the sets of possible target values based on differences between (i) a predicted torque output of the engine corresponding to each of the sets of possible target values and the at least one of the target lift state at the future time and the target number of activated cylinders at the future time and (ii) a torque request.

20. The method of claim 18 further comprising determining the cost for each of the sets of possible target values based on differences between the possible target values and reference values.

* * * * *